(12) United States Patent
Kao

(10) Patent No.: US 6,456,970 B1
(45) Date of Patent: Sep. 24, 2002

(54) MINIMIZATION OF SEARCH NETWORK IN SPEECH RECOGNITION

(75) Inventor: Yu-Hung Kao, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/353,918

(22) Filed: Jul. 15, 1999

Related U.S. Application Data

(60) Provisional application No. 60/094,856, filed on Jul. 31, 1998.

(51) Int. Cl.$^7$ .............................................. G10L 15/14
(52) U.S. Cl. ...................... 704/256; 704/254; 704/255; 704/253; 704/251
(58) Field of Search ................................ 704/256, 254, 704/244, 255, 253, 251, 226, 231, 247, 243, 240, 242, 236

(56) References Cited

U.S. PATENT DOCUMENTS

| | | | | | |
|---|---|---|---|---|---|
| 4,829,575 A | * | 5/1989 | Lloyd | .......................... | 704/256 |
| 5,625,749 A | * | 4/1997 | Goldenthal et al. | ......... | 704/254 |
| 5,699,456 A | * | 12/1997 | Brown et al. | ................ | 382/226 |
| 5,719,997 A | * | 2/1998 | Brown et al. | ................ | 704/256 |

FOREIGN PATENT DOCUMENTS

EP 0 248 377 B1 7/1994

OTHER PUBLICATIONS

Singer et al., ("Non–Uniform unit parsing for SSS–LR continuous speech recognition", ICASSP–94., 1994 IEEE International Conference on Acoustics, Speech, and Signal Processing, 1994, vol. ii, pp. 149–152, 4/94).*

Katunobu et al., ("Continuous speech recognition by context–dependent phonetic HMM and an efficient algorithm for finding N–Best sentence Hypothesis", ICASSP–92., 1992 IEEE International Conference on Acoustics, Speech, and Signal Processing, vol. 1, pp. 21–24, 3/92).*

Ken Hanazawa et al., "An Efficient Search Method for Large–Vocabulary Continuous–Speech Recognition" IEEE, pp. 1787–1790, Apr. 21, 1997.

Hiroshi Hirayama et al., "DSP–Based Large Vocabulary Speaker–Independent Speech Recognition" NEC Research and Development, vol. 37, No. 4, pp. 528–534, Oct. 1, 1996.

Neeraj Deshmukh et al., "Efficient Search Strategies in Hierarchical Pattern Recognition Systems" IEEE, pp. 88–91, 1995.

* cited by examiner

*Primary Examiner*—Vijay Chawan
(74) *Attorney, Agent, or Firm*—Robert L. Troike; Frederick J. Telecky, Jr.

(57) ABSTRACT

The search network in a speech recognition system is reduced by parsing the incoming speech expanding all active paths (101), comparing to speech models and scoring the paths and storing recognition level values at the slots (103) and accumulating the scores and discarding previous slots when a word end is detected creating a word end slot (109).

8 Claims, 3 Drawing Sheets

FIG. 4

MINIMIZATION OF SEARCH NETWORK IN SPEECH RECOGNITION

This application claims priority under 35 USC §119(e)(1) of provisional application number 60/094,856, filed Jul. 31, 1998.

TECHNICAL FIELD OF THE INVENTION

This invention relates to speech recognition and more particularly to minimization of a search network.

BACKGROUND OF THE INVENTION

Continuous speech recognition is a resource-intensive algorithm. Commercial dictation software requires more than 10M bytes to install on the disk and 32M bytes RAM to run the application. Static memory is required to store the program (algorithm), grammar, dictionary, and acoustic models. The data will not change, therefore can be stored in disk or ROM. Dynamic memory is required to run the search. Search involves parsing the input speech and building a dynamically changing search tree, therefore, RAM is required for both Read and Write capabilities. The target application for this patent disclosure is for small vocabulary speech recognition implemented on, for example, fixed-point DSP chips. On a DSP implementation, RAM size is a critical cost factor because RAM occupies a large percentage of the total die size. ROM, on the other hand, is much cheaper in silicon real estate.

SUMMARY OF THE INVENTION

In accordance with one embodiment of the present invention, in the search network expansion in speech recognition only the current slot is maintained as long as we know what model and what state the slot is at and the previous slots can be discarded.

DESCRIPTION OF THE DRAWINGS

FIG. 4 illustrates expansion of a sentence;

DESCRIPTION OF PREFERRED EMBODIMENTS OF THE PRESENT INVENTION

Figure 1:
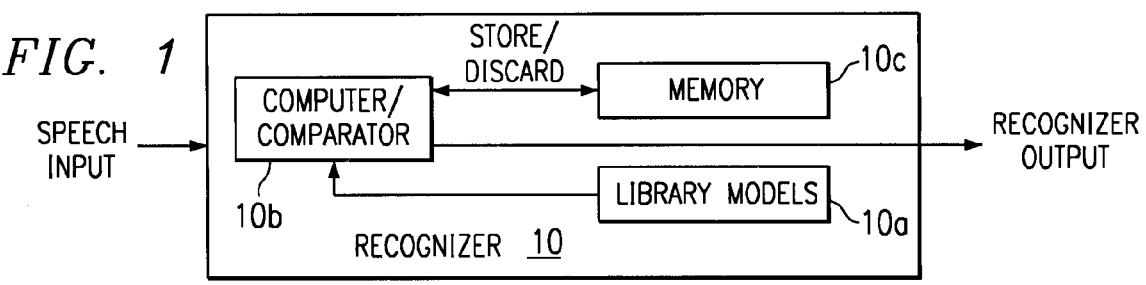
FIG. 1 is an overall block diagram of speech recognition system.
Figure 2:
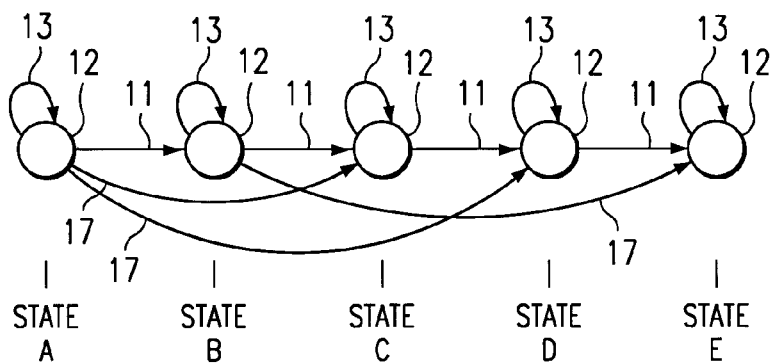
FIG. 2 illustrates an HMM.

Referring to FIG. 1 there is illustrated a speech recognition system. The recognizer 10 includes a library 10a including a pronunciation dictionary, grammars, acoustic models, etc. The recognizer 10 further includes a computer/comparator 10b for comparing parsed input speech to the models and for computing a score and memory 10c for storing operation program and storing results from comparing and computing results. The parsed speech input is compared to speech models and the match produces the recognized output. The framework of our recognition system is HMM (Hidden Markov Model). Where the sentence grammar is represented by a Markov model with states 12 and transitions 11 among states (see FIG. 2). Transitions are associated with words. When a transition is taken from state A to state B, one of the words associated with that transition must be evaluated. Then from state B, there are again many outgoing transitions to choose from, each transition has words associated with it. Taking a transition means going through a word. This Markov model thus describes what words a sentence can start with, what words follow what words, and what words a sentence can end with. This is a computational representation of a grammar.

Each word is also represented by a Markov model with states and transitions. Acoustics are associated with each state. Transition into a state means evaluating the acoustics associated with that state. Usually a left-to-right HMM is used for word model, there are straight-through transitions 11 representing average speed of speaking, self-loop transitions 13 representing slow speed, and skip transitions 17 representing fast speed. Acoustics can also be associated with transitions (as in sentence HMM); however, in most speech recognition systems the acoustics are associated with states for its simplicity.

These two levels of HMM's describe the search space of a speech recognition system (see Y. H. Kao, W. Anderson, H. S. Lim, "A Multi-Lingual, Speaker-Independent, Continuous-Speech Recognizer on TMS320C5x Fixed-Point DSP," ICSPAT 1997, San Diego, USA and Y. H. Kao, "Fixed-Point Implementation of IG Speech Recognizer on C5x DSP," TI Tech Report, 1996). From the top level sentence grammar to the bottom level acoustics, the recognition algorithm (parser) can run the input acoustic vectors through this search space to find out the best path by building a search network. The best path found at the end of the input vectors is the recognition result. Grammars can be represented by context-free-grammar (for small vocabulary tasks) or N-Gram (for large vocabulary tasks). In a large vocabulary system, usually a three level system (sentence, word, phone) is used rather than the two level system (sentence, word). It is impossible to build individual word models for so many words, therefore, phonetic models are used as the base units (see Y. H. Kao, K. Kondo, "Phonetic Modeling Using Acoustic Decision Tree," TI Tech Report, 1997; Y. H. Kao, "Acoustic Decision Tree: A Tutorial," TI Tech Report, 1997; Y. H. Kao, "Acoustic Decision Tree: Performance Analysis," TV Tech Report, 1997).

Figure 3:
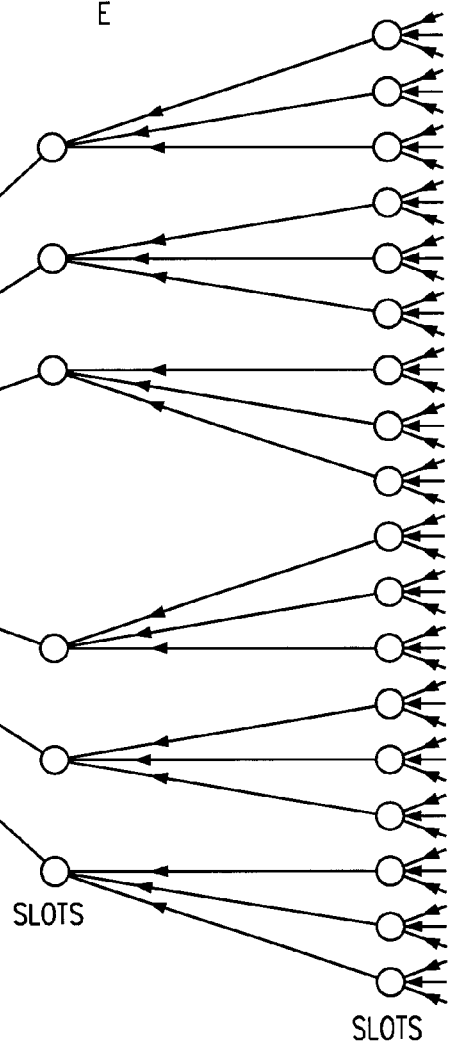
FIG. 3 illustrates path expansion slots and pointers back to previous slot.

Search is expanding all the possible paths in the grammar (see FIG. 3). When a speech frame comes in, first we expand all the possible word in the sentence HMM. To expand each word, we need to expand their individual phone sequence in the lexicon HMM. To expand each phone, we need to expand their phonetic HMM's, which has acoustics as the observations. There are three levels of HMM in the structure. The upper level transitions may take more than one speech frame, only the bottom level transitions consume exactly one speech frame. A speech frame is, for example, 20 milliseconds long. The upper level transition can be taken only after its corresponding observation is completed (which may take several speech frames).

Speech recognition is to expand a search network following the grammar-word search space definition. There are many ways of actually defining the computer data structure and implementing the algorithm. We will use our algorithm as an example and describe the ways to minimize the network.

We define a structure called slot as the building block of the search network. Using a C structure, it is defined as:

```
struct slot {
    int         model_index;
    int         state_index;
    float       score;
    struct      slot *backptr;
    int         time;
    int         last_time;
    struct      slot *next_state;
    struct      slot *next_word;
}
```

Model_index is an integer representing what model this slot is at. For example, the whole search space is represented by one sentence model, we assign model_index 0 to the sentence model. This sentence model is composed of many words and how these words can be put together, we assign model_index 1, 2, 3, . . . etc. for each of the word models. Model_index can not overlap, each index represents a different model (sentence or words).

State_index is an integer representing what state (in a model, be it sentence or words) this slot is at. Both sentence and word models are HMM's, they are evaluated state by state. When building the search network, we need to know which state we are at, so we know what next state(s) to transition to. Within each model, state_index starts from 1, 2, 3, . . . etc. State 1 in model 1 is different from state 1 in model 2.

Score is the accumulated score of this path up to this slot.

Backptr is a pointer that points back to the previous slot in the path. For example, if state 10 can come from state 9 (straight-through transition), or state 8 (skip transition), or state 10 (self-loop transition); after Viterbi decoding which keeps only the best path coming into a state, the backptr of the state 10 slot will point to one of the three slots described above.

Time is the time index when this slot is first created. For example, we use 20 ms frame length. The input speech is segmented into 20 ms frames, preprocessed to extract a feature vector, then fed into the search algorithm. During the search of the first frame (0–20 ms), time is 1; during the search of the second frame (20–40 ms), time is 2, it goes on like this.

Last_tine is the last time this path is updated. We need this time stamp for slot management (garbage collection). Expansion of the search network is an exponential growth problem, bad scored paths have to be pruned to reduce the size of search network. When a path has good score and should be retained for future expansion, we propagate the current time stamp backward through the whole path (a path is a backward linked list of slots). If the last_time of a slot is the current time, it must be retained and can not be reused. Otherwise, it can be reused because its path is not within the search beam and thus last_time not updated.

Next_state points to the next slot of active state within this model to be evaluated. When evaluating a model, many states can be active and need to be evaluated, they are linked together by next_state.

Next_word points to the next slot of active word for this sentence state to be evaluated. When evaluating a sentence model, its slots of active states are linked by next_state. But for each state, it has words that are still being evaluated (a word needs more than one frame to complete). Next_word links all these pending word evaluation slots. Next_word will start from a sentence level slot.

Search is the most complicated part of the speech recognition algorithm. The best way to learn the algorithm is to trace the C code. Please refer to our well commented C code and a companion documentation (see Y. H. Kao, "IG (Integrated Grammar) Algorithm," TI Tech Report, 1996).

Figure 4:
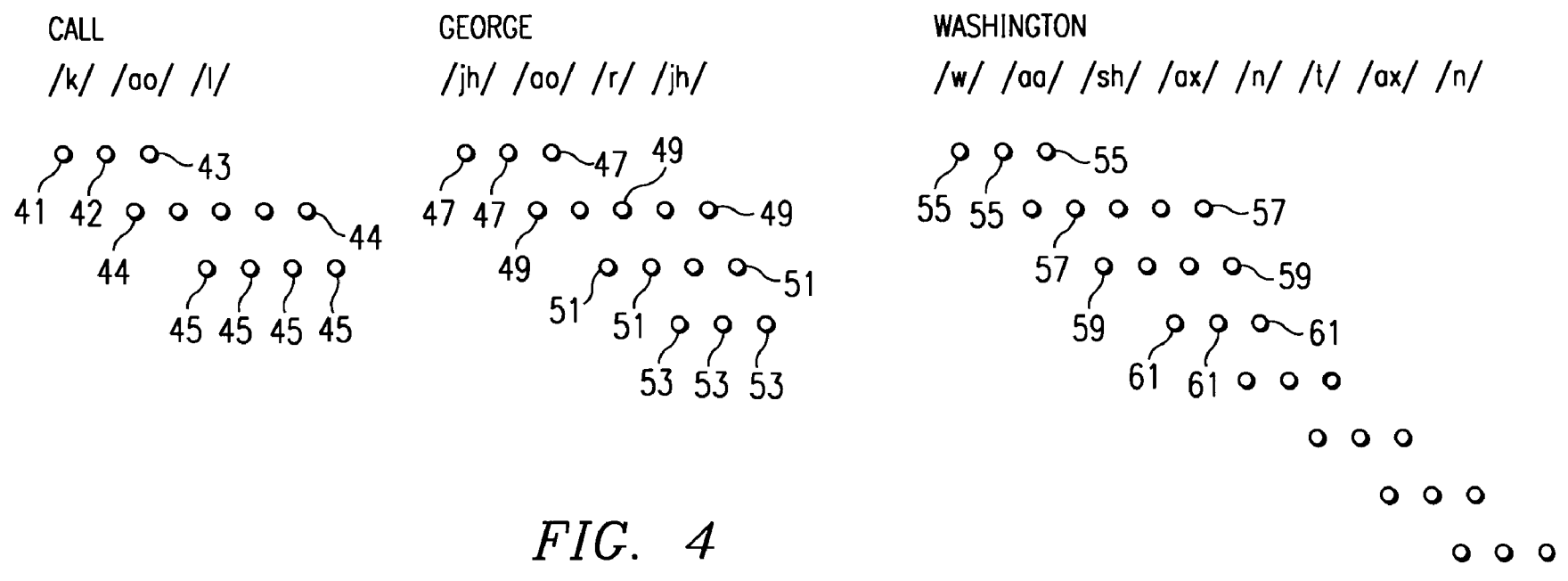

FIG. 4 illustrates an example of the search space for the sentence grammar "Call George Washington," The layers of grammars are sentences, words, phones and acoustic distributions (bottom layer) represented by the small circles. The expansion goes from word "call" to phone "|K|" to the top three circles 41–43 for the acoustics of "|K|". The expansion then goes to the second phone "|ao|" to the five circles 44 and then back to the phone "|l|". The expansion then goes to the acoustics for "|l|" represented by the small circles 45. After the last circle 45, the expansion goes to the word "George" then to the phone "|jh|". The expansion continues with the three acoustics 47, then the phone "|ao|" and then the five acoustics 49. After the last acoustic 49, the search goes to the phone "|r|", followed by the four acoustics followed by the phone "|jh|", followed by the three acoustics 53. The last acoustic 53 is followed by the word "Washington" followed by the phone "|w|". This is followed by the three acoustics 55. The acoustics 55 are followed by the phone "|ao|" followed by the five acoustics 57, followed by the phone "|sh|". The phone "|sh|" is followed by its four acoustics 59, followed by the phone "|ax|" and its three acoustics 61. The expansion continues similarly for the phones "|n|", "|t|", "|ax|" and "|n|" followed by their associated three acoustics.

For the sake of continuing our discussion, we will describe the idea of search in a high level, and then explain the search network minimization process.

After defining the slot data structure as the building block of the search network, it is straightforward to do the search network expansion. It can be summarized as:
Build slots for all the sentence states where a sentence can start with

```
For (each input acoustic vector) {
    For (each sentence state slot) {
        Find all the words that are associated with its outgoing transition
        build word start slots and maintain still-in-evaluation word slots
        For (each word state slot) {
            Transition to next state and evaluate an acoustic vector
            If (reach word end) {
                Pass the info to sentence level for next sentence
                state transition
            }
        }
    }
}
```

For each input acoustic vector (20 ms), we have to traverse down the search space as shown, for example, in FIG. 4 to reach the bottom layer so an acoustic evaluation can be done. The acoustic score and the transition score are accumulated and stored in the score field of the slot (put in storage 10c of FIG. 1). The backptr field points to previous slot (where this slot comes from). Therefore, for each input acoustic vector, the evaluation will add at least one slot to the search path because one acoustic evaluation has to be done. Sometimes more than one slot has to be added to the path because sentence level slot has to be added before the acoustic evaluation slot can be added.

This is called trace mode, every input acoustic vector is mapped into a model acoustic vector and recorded in the search path. It is very expensive because a very long linked list of slots is created. For example, a 5-second input utterance has 5×50=250 input vectors. A linked list of more than 250 slots has to be created for every possible theory within the search beam width.

For training purpose, this is necessary because every input vector needs to be mapped to a model vector in order to update that model vector. But for recognition purpose, this is an overkill because we only want to know what words are recognized. We do not need to know the microscopic trail of how each vector is mapped.

Now let's study the search network expansion in more detail; specifically, we would like to examine the reason for keeping slots in the process.

For the purpose of expansion, only the current slot needs to be maintained in storage 10c (FIG. 1). A slot provides the model_index and the state_inder in that model. As long as we know what model (sentence or words) and what state this slot is at, we can consult the model and figure out what next states to transition to. There is no need to know the previous slots for the search network expansion purpose. By this argument, only one slot, the current slot, has to be maintained in a path; all previous slots in a path can be discarded.

However, for the recognition purpose, we want to know what words are recognized after the expansion is completed. Because of this reason, one slot has to be maintained for each recognized word in a search path. For the example of FIG. 4, after "call" has been recognized, a slot for the word "call" is all that is maintained. All the other expansion of phones and acoustics can be discarded. A control signal between computer/comparator 10b and storage 10c controls the discard. This is done after computation. Compute all slots but discard previous slot since present slot has accumulated score and once a word is determined we only need the word. The back pointer points to previous word.

By the above argument, for a 10-digit recognition, we only have to keep 10 slots in the search path. Each slot represents one recognized digit. This is the shortest possible path we can do to solve the 10-digit search problem.

Figure 5:
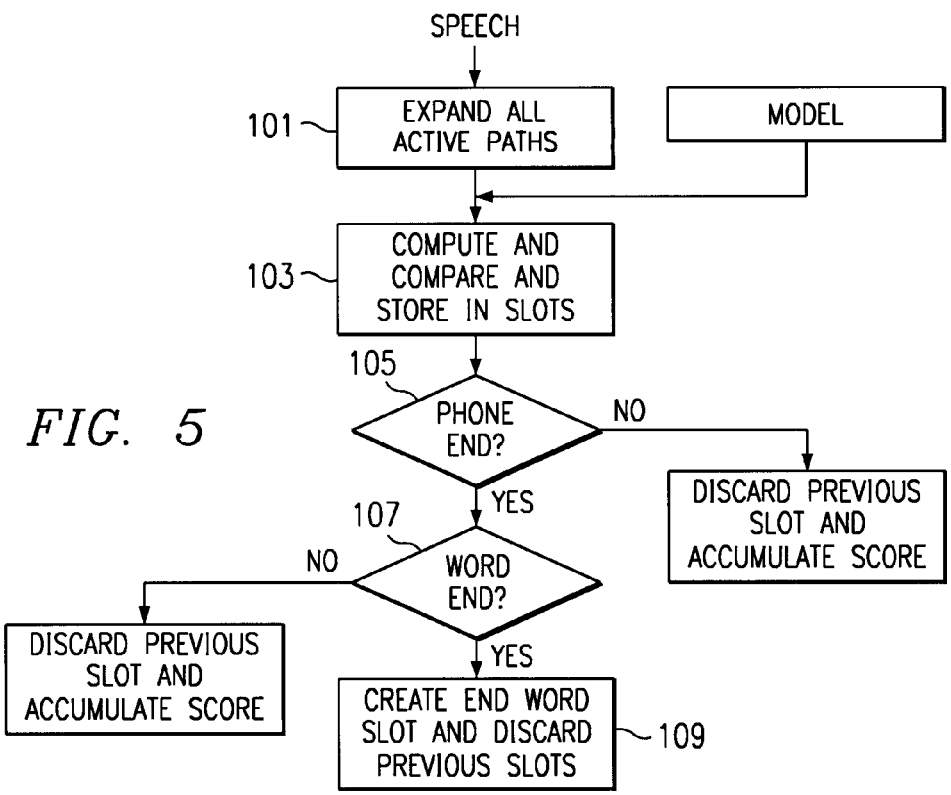
FIG. 5 is a flow chart of the minimization of the search network.

Referring to FIG. 5 there is illustrated a flow chart for expansion and keeping and discarding slots. The input speech is expanded in step 101 and compared to the library models and dictionary 10a at computer/comparator 10b at step 103 and the score is placed in the slots and the score is accumulated. The present slot scores are kept and poor score paths are discarded. When a phone end is detected at step 105 it is determined if a word end. If a word end is not detected, the previous slots are discarded and the score accumulated in the present slot. When a word is detected (step 107), a word slot is created (step 109) for the identified word and all previous slots are discarded and the identified word is built into the search network. The back pointer then points to the previous word.

Unfortunately, the one-word-one-slot only network does not carry any sentence level information. Sentence level information is necessary to represent grammar, which describes how words can be put together. At the minimum, one sentence level slot at the word boundary is required to provide the information to carry on the search into the next word. Without this sentence level slot, we do not know what next word to evaluate when we complete evaluating the current word. In addition to carrying the grammar information, sentence level slot is also used to carry N-Best information and provide a base for sentence level Viterbi decoding.

Armed with the above understanding of the search mechanism, we can now bound the length of a search path given a grammar. For example, for a single word recognition grammar, the shortest possible path consists of one word, three slots:

$$S_1WS_2$$

where W is the word and $S_1$ is the silence before the word and $S_2$ the silence after the word W. The longest possible path is 4N+3 where there are N words (not counting silence), N+1 silence slots and 2N+2 sentence slots. The longest path of three words (beginning silence+the recognized word+ending silence) is seven slots:

$$S_1W_{sil}S_1WS_2W_{sil}S_2$$

where W represents a word level slot, S represents a silence level slot.

For a 10-digit grammar, the shortest possible path has 10 digits+11 sentence slots=21 slots. The longest possible path has 10 digits+11 silence+22 sentence slots=43 slots. It is independent of the length of the input utterance, it only depends on the grammar.

This minimization principle can be easily generalized into the three level (sentence, word, phone) search structure for large vocabulary task.

In continuous speech recognition, silence is considered a word. Grammar allows optional silence word in all word boundaries. However, the between word acoustics can vary a lot—silence or background noises. Usually we use a large number of mixtures in the silence model in order to capture the widely varying acoustics.

To minimize the search path, we want to let one silence model capture all the between word acoustics. We do not want to allow several different silence models to appear in one between word segment because it will lengthen the path unnecessarily.

We calibrated the peak slot usage on two tasks: single word military alphabet recognition (7087 files) and 10 continuous digits recognition (1390 files).

Two conditions were run for these two tasks:

Trace mode, which is required for model update.

Optimally minimized search network, as described in this application.

Figure 6:
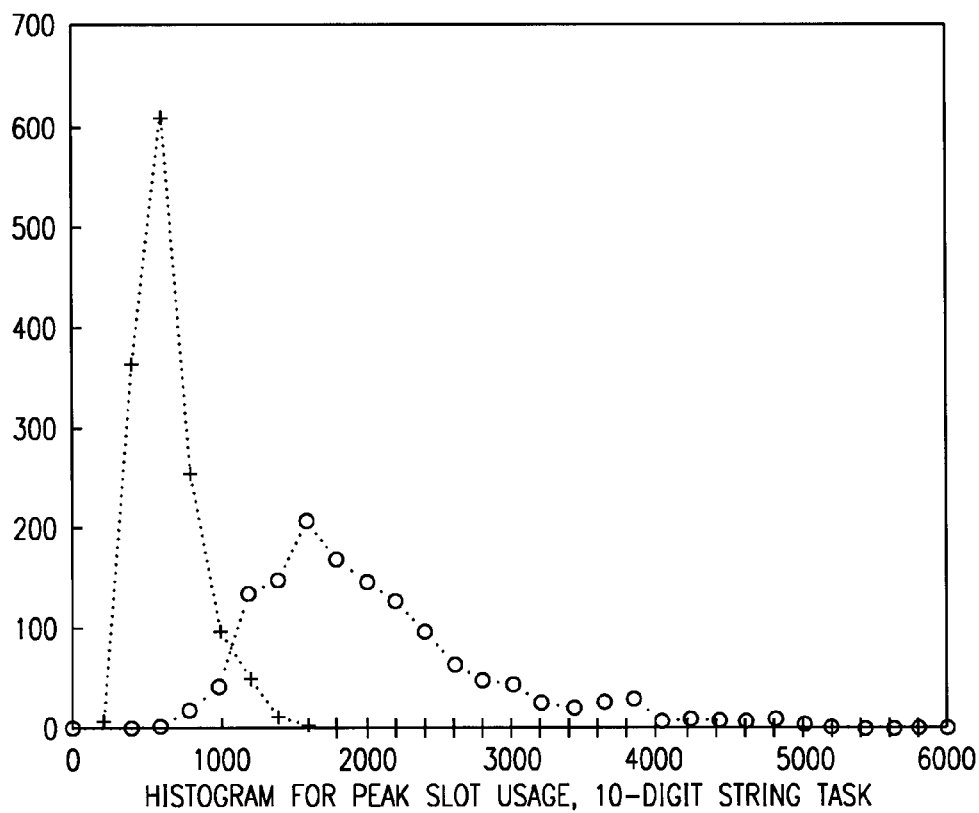
FIG. 6 is a histogram for peak slot usage for a 10-digit string task.

Peak slot usage histograms are plotted in FIG. 6. In the plots, they are represented by circle and plus respectively. The X-axis is the peak slot count, the Y-axis is the number of utterances that requires minimum X-axis slots to be successfully parsed. The more left the distribution is, the more efficient the search is.

For the single word military alphabet recognition task, the max, mean, and standard deviation of the peak slot usage are:

|  | max | Mean | std-dev |
|---|---|---|---|
| Trace | 3008 | 941 | 253 |
| Optimal | 602 | 352 | 43 |

For the 10 continuous digits recognition task, the max, mean, and standard deviation of the peak slot usage are:

|  | max | mean | std-dev |
|---|---|---|---|
| Trace | 8769 | 2045 | 807 |
| Optimal | 2308 | 638 | 216 |

The optimally minimized search network reduces about 20% of the peak slot usage from our previous effort for both tasks.

We proposed ways to minimize the search network within the framework of our search algorithm. The search path length can be bounded by the grammar and is independent of input utterance length. It achieved 20% reduction in search space compared to our previous non-optimal effort. Compared to the trace mode, the reduction is 70% to 80%. Usually the trace mode is done under supervision, therefore, the peak slot usage will not be nearly as large. However, if unsupervised model update is needed, the peak slot usage will be very high, as depicted in the histogram plots.

In this application we used a slot structure with 8 fields. In another application, we will describe a way to reduce that into 5 fields. Combining the search network minimization described in this application and the slot size reduction, the 10-digit task can be done with only 1600 slots×5 words=8K words of search space (RAM) (see Y. H. Kao, "Reducing Slot Size in Speech Recognition Search Network by Data Packing and a New Slot Management Mechanism," TI Tech Report, 1998). In our 1390 10-digit utterances, only two utterances require more than 1600 slots to parse.

What is claimed is:

1. A method of reducing a search network in speech recognition comprising the steps of:

parsing input speech;

building a dynamically changing search tree by expanding all active search paths and creating search slots containing model index and model state and an accumulated score of matching to speech models of the path up to the search slot and comparing the parsed input speech to speech models and identifying what model and what model state and computing said accumulated score of matching; and discarding all search slots previous to a current search slot once the current search slot value is determined.

2. The method of claim 1 including the step of determining the end of a word and creating a word end search slot when a word end is determined and discarding all previous search slots.

3. The method of claim 1 wherein each search slot stores the following: a model index, a state index, a score, a back pointer, a time, last time, next state and next word.

4. The method of claim 1 including the step of limiting the longest possible path to 4N+3 where there are N words (not counting silence) at most N+1 silence words plus (2N+1)+1 sentence slots.

5. A speech recognizer for input speech comprising: a storage; a library of grammar and speech models; a computer/comparator coupled to said library and responsive to said input speech for building a search tree by expanding active search paths and creating search slots containing model index and model state and an accumulated score of matching to the speech models of the path up to the search slot; said computer/comparator computing a score value for said match and said accumulated score at each search slot and said computer/ comparator coupled to said storage for storing said model index, model state and accumulated score for said search slots and for discarding said previous search slots once said current search slot is determined.

6. The speech recognizer of claim 5 wherein said computer/comparator determines the end of a word and creates a word search slot and discards all previous search slots.

7. The speech recognizer of claim 5 or 6 wherein for each search slot there is stored a model index, a state index, a score, a back pointer, a time, a last time, a next state and a next word.

8. The speech recognizer of claim 5 wherein said computer/comparator permits only one silence search slot between words.

* * * * *